(12) United States Patent
Ge et al.

(10) Patent No.: US 8,797,754 B2
(45) Date of Patent: Aug. 5, 2014

(54) POWER SUPPLY SYSTEM FOR SERVER CABINET

(75) Inventors: Ting Ge, Shenzhen (CN); Hui Li, Shenzhen (CN); Ya-Jun Pan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 116 days.

(21) Appl. No.: 13/559,245

(22) Filed: Jul. 26, 2012

(65) Prior Publication Data
US 2013/0279104 A1  Oct. 24, 2013

(30) Foreign Application Priority Data
Apr. 19, 2012 (CN) .......................... 2012 1 0116038

(51) Int. Cl.
*H05K 7/00* (2006.01)
(52) U.S. Cl.
USPC .................... 361/760; 361/679.4; 361/679.02
(58) Field of Classification Search
USPC ................................. 361/760, 679.02, 679.4
See application file for complete search history.

(56) References Cited

U.S. PATENT DOCUMENTS

| | | | |
|---|---|---|---|
| 6,721,188 B1 * | 4/2004 | Jarvis et al. | 361/760 |
| 2008/0030947 A1 * | 2/2008 | Behrens et al. | 361/686 |

* cited by examiner

*Primary Examiner* — Andargie M Aychillhum
(74) *Attorney, Agent, or Firm* — Novak Druce Connolly Bove + Quigg LLP

(57) ABSTRACT

A power supply system provides power to a server cabinet, which includes a number of servers. A number of sockets, first and second electrical connecting portions, first and second through holes are arranged on a power connecting board. Each socket includes a first power pin connected to the first electrical connecting portion and a first ground pin connected to the second electrical connecting portion. A number of power interfaces, third and fourth electrical connecting portions, third and fourth through holes are arranged on a base. Each power interface includes a second power pin connected to the third electrical connecting portion and a second ground pin connected to the fourth electrical connecting portion. The base is electrically connected to the power connecting board when the first connecting element engages in the first and third through holes and the second connecting element engages in the second and fourth through holes.

5 Claims, 1 Drawing Sheet

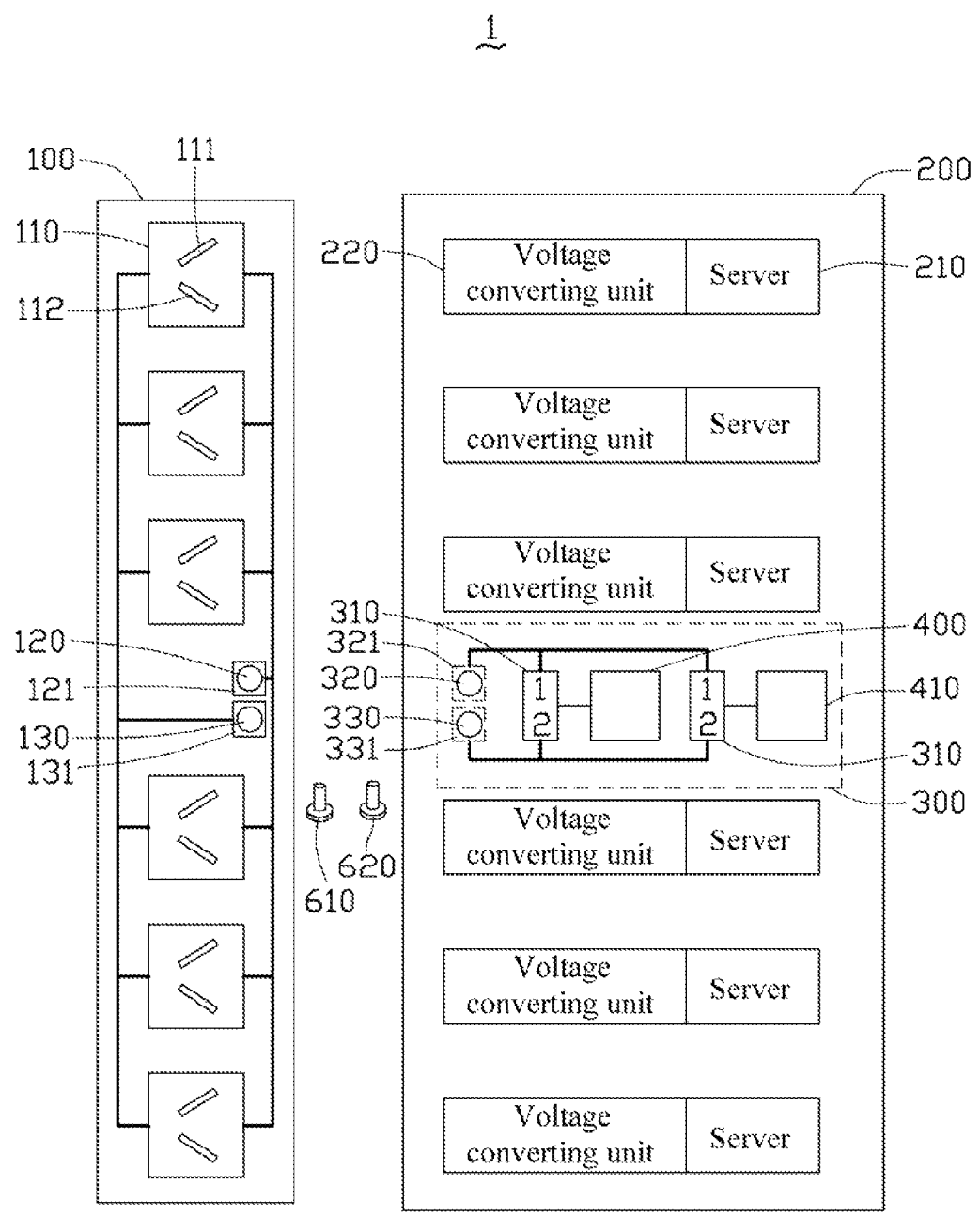

POWER SUPPLY SYSTEM FOR SERVER CABINET

BACKGROUND

1. Technical Field

The present disclosure relates to power supply systems, and particularly to a power supply system for providing power to a server cabinet.

2. Description of Related Art

At present, server cabinets are used widely in many enterprises. The power supply system of the server cabinet provides power to each server. However, in a standard server cabinet, a main power supply and a standby power supply provide power to one server. Thus, the number of the power supplies will add additional costs.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments.

The FIGURE is a schematic diagram of a power supply system for a server cabinet in accordance with an exemplary embodiment of the present disclosure.

DETAILED DESCRIPTION

The disclosure, including the drawing, is illustrated by way of example and not by way of limitation. References to "an" or "one" embodiment in this disclosure are not necessarily to the same embodiment, and such references mean at least one.

The FIGURE is a power supply system 1 in accordance to the embodiment. The power supply system 1 is used for providing power to a server cabinet 200. The server cabinet 200 includes a plurality of servers 210. The power supply system 1 includes a power connecting board 100, a base 300, a plurality of power supplies, a first connecting element 610, and a second connecting element 620. In one embodiment, the server cabinet 200 includes six servers 210, a main power supply 400, and a standby power supply 410. The main power supply 400 and the standby power supply 410 each can output 1800 watts power and 12 volts. In other embodiments, the number of the power supplies can be adjusted according to the number of the servers 210 in the server cabinet 200. In one embodiment, the first connecting element 610 and the second connecting element 620 are screws.

A plurality of sockets 110 (such as six sockets 110), a first electrical connecting portion 121, a second electrical connecting portion 131, a first through hole 120 defined in the first electrical connecting portion 121, and a second through hole 130 defined in the second electrical connecting portion 131 are all arranged on the power connecting board 100. Each socket 110 includes a power pin 111 and a ground pin 112. Each power pin 111 is connected to the first electrical connecting portion 121. Each ground pin 112 is connected to the second electrical connecting portion 131. In one embodiment, the first and second connecting portions 121 and 131 are copper pieces.

A plurality of voltage converting units 220 is arranged inside the server cabinet 200. Each voltage converting unit 220 is connected to a corresponding one of the servers 210. Each voltage converting unit 220 is connected to a corresponding socket 110, to convert a voltage received from the socket 110 to a requirement voltage of the server 210 and output the requirement voltage to the servers 210. In other embodiments, the voltage converting unit 220 can be deleted if the server 210 is equipped with a voltage converting unit.

A plurality of power interfaces 310 (such as two power interfaces 310), a third electrical connecting portion 321, a fourth electrical connecting portion 331, a third through hole 320 defined in the third electrical connecting portion 321, and a fourth through hole 330 defined in the fourth electrical connecting portion 331 are all arranged on the base 300. Each power interface 310 includes a power pin 1 and a ground pin 2. Each power pin 1 is connected to the third electrical connecting portion 321. Each ground pin 2 is connected to the fourth electrical connecting portion 331. In one embodiment, the third and fourth electrical connecting portions 321 and 331 are copper pieces.

The main power supply 400 and the standby power supply 410 are arranged on the base 300. An input terminal of each power supply is connected to an external alternate current (AC) voltage. An output terminal of each power supply is connected to a power interface 310. The base 300 is electrically connected to the power connecting board 100 when the first connecting element 610 engages in the first through hole 120 and the third through hole 320, and the second connecting element 620 engages in the second through hole 130 and the fourth through hole 330. Namely, the first electrical connecting portion 121 and the third electrical connecting portion 321 are electrically connected together, and the second electrical connecting portion 131 and the fourth electrical connecting portion 331 are electrically connected together.

In use, the main power supply 400 converts the AC voltage to a direct current (DC) voltage and outputs the DC voltage to the voltage converting unit 220, which is connected to the power socket 110 through the power interface 310, the third electrical connecting portion 321, the fourth electrical connecting portion 331, the first electrical connecting portion 121, the second electrical connecting portion 131, and the power socket 110 of the power connecting board 100. The voltage converting units 220 convert the DC voltage to requirement voltages of the servers 210 and outputs the requirement voltages to the servers 210. If the main power supply 400 works abnormally, the standby power supply 410 converts the AC voltage to DC voltage and outputs the DC voltage to the voltage converting unit 220, which connected to the power socket 110 through the power interface 310, the third electrical connecting portion 321, the fourth electrical connecting portion 331, the first electrical connecting portion 121, the second electrical connecting portion 131, and the power socket 110 of the power connecting board 100. The voltage converting units 220 convert the DC voltage to requirement voltages of the servers 210 and outputs the requirement voltages to the servers 210. Therefore, the power supply system 1 can provide power to six servers 210 by using two power supplies 400 and 410, to reduce the number of the power supplies.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A power supply system for a server cabinet which comprises a plurality of servers, the power supply system comprising:

a power connecting board, wherein a plurality of sockets, a first electrical connecting portion, a second electrical connecting portion, a first through hole defined in the first electrical connecting portion, and a second through hole defined in the second electrical connecting portion are all arranged on the power connecting board, each socket comprises a first power pin and a first ground pin, each first power pin is connected to the first electrical connecting portion, each first ground pin is connected to the second electrical connecting portion;

a base, wherein a plurality of power interfaces, a third electrical connecting portion, a fourth electrical connecting portion, a third through hole defined in the third electrical connecting portion, and a fourth through hole defined in the fourth electrical connecting portion are all arranged on the base, each power interface comprises a second power pin and a second ground pin, each second power pin is connected to the third electrical connecting portion, each second ground pin is connected to the fourth electrical connecting portion;

a plurality of power supplies arranged on the base, wherein an output terminal of each of the plurality of power supplies is connected to one of the plurality of power interfaces;

a first connecting element; and a second connecting element;

wherein the base is electrically connected to the power connecting board when first connecting element engaging in the first and third through holes, and the second connecting element engaging in the second and fourth through holes, to electrically connect the first and third electrical connecting portions and electrically connect the second and fourth electrical connecting portions.

2. The power supply system of claim 1, wherein the server cabinet comprises six servers and two power supplies, each power supply outputs 1800 watt power and 12 volt voltage.

3. The power supply system of claim 1, wherein the server cabinet comprises a plurality of voltage converting units, each of the plurality of voltage converting units is connected to one of the plurality of servers and one of the plurality of sockets, to convert a voltage received from the socket to a requirement voltage of the server and output the requirement voltage to the server.

4. The power supply system of claim 1, wherein the first to fourth electrical connecting portions are copper pieces.

5. The power supply system of claim 1, wherein the first and second connecting elements are screws.

* * * * *